United States Patent
Tanaka

(10) Patent No.: US 12,452,029 B2
(45) Date of Patent: Oct. 21, 2025

(54) ENDOSCOPE SYSTEM AND SCOPE

(71) Applicant: OLYMPUS MEDICAL SYSTEMS CORP., Hachioji (JP)

(72) Inventor: Takanori Tanaka, Hachioji (JP)

(73) Assignee: OLYMPUS MEDICAL SYSTEMS CORP., Tokyo (JP)

(*) Notice: Subject to any disclaimer, the term of this patent is extended or adjusted under 35 U.S.C. 154(b) by 99 days.

(21) Appl. No.: 18/368,091

(22) Filed: Sep. 14, 2023

(65) Prior Publication Data

US 2024/0007263 A1    Jan. 4, 2024

Related U.S. Application Data

(63) Continuation of application No. PCT/JP2021/010283, filed on Mar. 15, 2021.

(51) Int. Cl.
 *H04B 3/00* (2006.01)
 *H04L 7/00* (2006.01)
 *H04L 25/00* (2006.01)

(52) U.S. Cl.
 CPC ................... *H04L 7/0012* (2013.01)

(58) Field of Classification Search
 CPC .... H04L 7/0012; H04L 7/0331; H04L 7/0008
 USPC .......... 375/238, 219, 220, 222, 257
 See application file for complete search history.

(56) References Cited

U.S. PATENT DOCUMENTS

| | | | |
|---|---|---|---|
| 9,628,255 B1* | 4/2017 | Baidas | H04L 7/0008 |
| 2014/0002153 A1* | 1/2014 | Yang | H04L 7/0331 |
| | | | 327/158 |

FOREIGN PATENT DOCUMENTS

| | | |
|---|---|---|
| CN | 103705198 A | 4/2014 |
| JP | 2012-10160 A | 1/2012 |
| JP | 2013-132385 A | 7/2013 |

OTHER PUBLICATIONS

International Search Report dated Apr. 27, 2021, issued in counterpart International Application No. PCT/JP2021/010283, with English Translation. (4 pages).

* cited by examiner

*Primary Examiner* — Phuong Phu
(74) *Attorney, Agent, or Firm* — WHDA, LLP

(57) ABSTRACT

An endoscope system is provided in which a scope and a control unit are communicably connected, wherein the control unit includes a reference clock generation circuit configured to generate a reference clock, and a superimposed signal generation circuit configured to generate a transmission signal in which data is multiplexed by changing a duty ratio of the reference clock, and the scope includes a high-speed clock generation circuit configured to generate a high-speed clock having a higher frequency from the transmission signal, a counter circuit configured to determine the duty ratio of the transmission signal in synchronization with the high-speed clock, and a data determination circuit configured to demodulate the data based on the duty ratio determined by the counter circuit.

11 Claims, 12 Drawing Sheets

US 12,452,029 B2

ENDOSCOPE SYSTEM AND SCOPE

CROSS-REFERENCE TO RELATED APPLICATIONS

The present application is a continuation application based on PCT Patent Application No. PCT/JP2021/010283, filed on Mar. 15, 2021, the entire content of which is hereby incorporated by reference.

BACKGROUND

Technical Field

The present invention relates to an endoscope system and a scope.

Description of the Background

An endoscope system includes a camera unit provided at a distal end of an insertion portion of an endoscope, and a control unit that controls the camera unit. The camera unit is connected by a signal line to the control unit connected to a proximal end of the endoscope. A control signal for controlling the camera unit is transmitted from the control unit via a signal line. Since the diameter of the insertion portion of the endoscope has been reduced, it is desired to transmit control signals to the camera unit through a small number of signal lines.

In a multiplex transmission system for an electronic endoscope disclosed in Japanese Unexamined Patent Application, First Publication No. 2012-10160 (hereinafter referred to as Patent Document 1), a camera unit and a control unit are connected by a single signal line, and a reference clock signal and a serial data signal are multiplexed and transmitted. The multiplex transmission system described in Patent Document 1 generates a transmission signal by modulating one edge position of the reference clock signal corresponding to a serial data signal. The camera unit separates the clock signal from the transmission signal and demodulates the serial data signal from the transmission signal based on the separated clock signal.

In the multiplex transmission system described in Patent Document 1, when the phases of the multiplexed transmission signal and the clock signal separated from the transmission signal deviate due to an external factor, the serial data signal may not be correctly demodulated from the multiplexed transmission signal.

SUMMARY

The present invention provides an endoscope system and a scope capable of correctly demodulating a data signal from a multiplexed transmission signal even if there is a phase difference between the multiplexed transmission signal and the clock signal separated from the transmission signal.

An endoscope system according to a first aspect of the present invention is an endoscope system in which a scope and a control unit are communicably connected, wherein the control unit includes a reference clock generation circuit configured to generate a reference clock, and a superimposed signal generation circuit configured to generate a transmission signal in which data is multiplexed by changing a duty ratio of the reference clock, and the scope includes a high-speed clock generation circuit configured to generate a high-speed clock having a higher frequency than the reference clock, a counter circuit configured to determine the duty ratio of the transmission signal in synchronization with the high-speed clock, and a data determination circuit configured to demodulate the data based on the duty ratio determined by the counter circuit.

A scope according to a second aspect of the present invention is a scope that is communicably connected to a control unit in an endoscope system, the scope including: a high-speed clock generation circuit configured to receive a data-multiplexed transmission signal by changing a duty ratio of a reference clock in the control unit, and generate a high-speed clock having a higher frequency than the reference clock; a counter circuit configured to determine the duty ratio of the transmission signal in synchronization with the high-speed clock; and a data determination circuit configured to demodulate data based on the duty ratio determined by the counter circuit.

According to the endoscope system and the scope of the present invention, even if there is a phase difference between the multiplexed transmission signal and the clock signal separated from the transmission signal, a data signal can be correctly demodulated from a multiplexed transmission signal.

EMBODIMENTS

First Embodiment

An endoscope system 100 according to a first embodiment of the present invention will be described with reference to FIGS. 1 to 4.

[Endoscope System 100]

Figure 1:
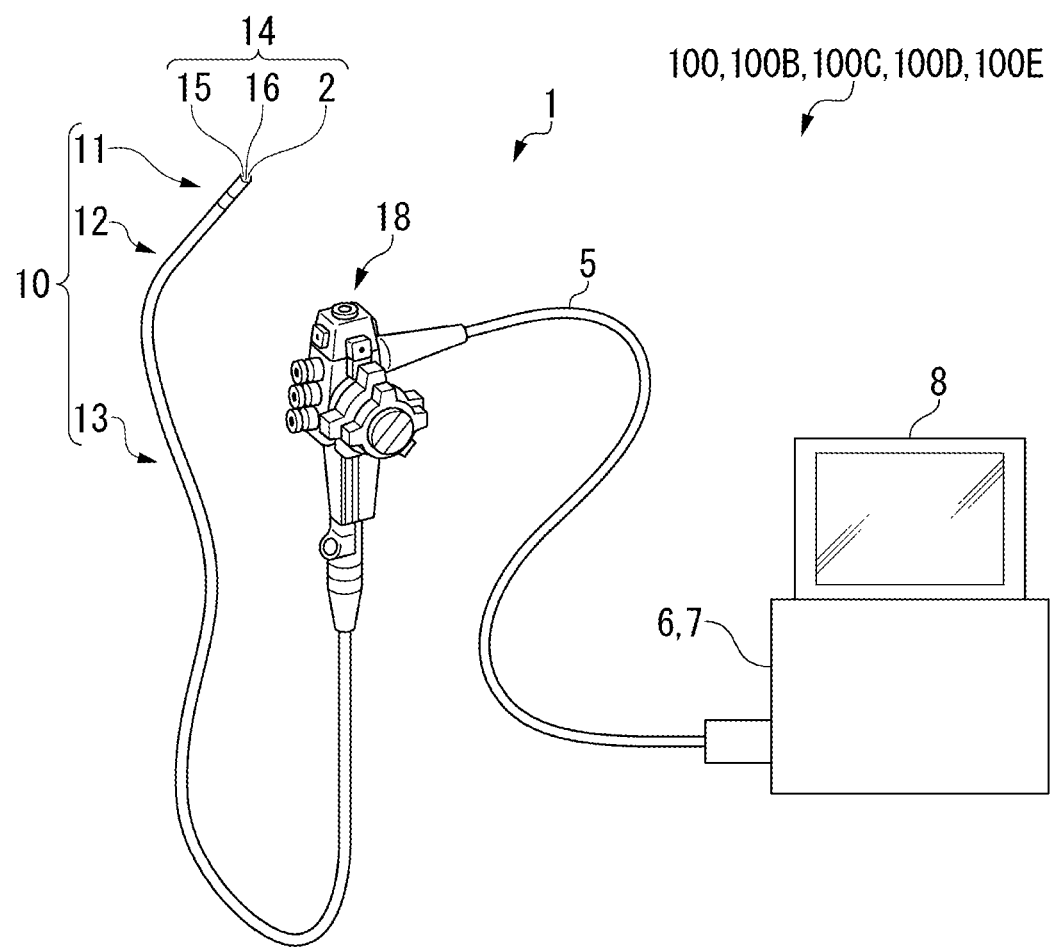
FIG. 1 is a perspective view of an endoscope system according to a first embodiment.

FIG. 1 is a perspective view of the endoscope system 100.

The endoscope system 100 includes an endoscope 1, a universal cord 5, a control unit 6, a light source device 7, and a display device 8. The control unit 6 and the light source device 7 are connected to the endoscope 1 via the universal cord 5.

The endoscope 1 is a device for observing or treating a diseased part inside the body. The endoscope 1 includes an insertion portion 10 and an operation portion 18. In this embodiment, the endoscope 1 is a flexible endoscope, but the endoscope 1 may be another type of endoscope (for example, a rigid endoscope or an ultrasonic endoscope).

The insertion portion 10 is a long tubular member that is inserted into the body. The insertion portion 10 has a hard distal end portion 11, a bending portion 12 that can bend in a plurality of different directions, and a flexible tube portion 13 that has flexibility. The distal end portion 11, the bending portion 12, and the flexible tube portion 13 are connected in order from the distal end side. The flexible tube portion 13 is connected to the operation portion 18.

The distal end portion 11 has a scope 14. The scope 14 has a light source 15, an optical system 16, and a camera unit 2. The bending portion 12 bends as the operator operates the operation portion 18. The flexible tube portion 13 is a tubular portion having flexibility.

The operation unit 18 accepts operations for the endoscope 1. The universal cord 5 is connected to the operation portion 18.

The control unit 6 comprehensively controls the entire endoscope system 100. The control unit 6 applies image processing to the video signal output from the camera unit 2.

The light source device 7 supplies illumination light emitted by the light source 15. The light source device 7 has, for example, a halogen lamp or an LED. The light source device 7 supplies the generated illumination light to the light source 15 under the control of the control unit 6.

The display device 8 displays an image of the affected area captured by the endoscope 1, various information about the endoscope system 100, and the like.

Figure 2:
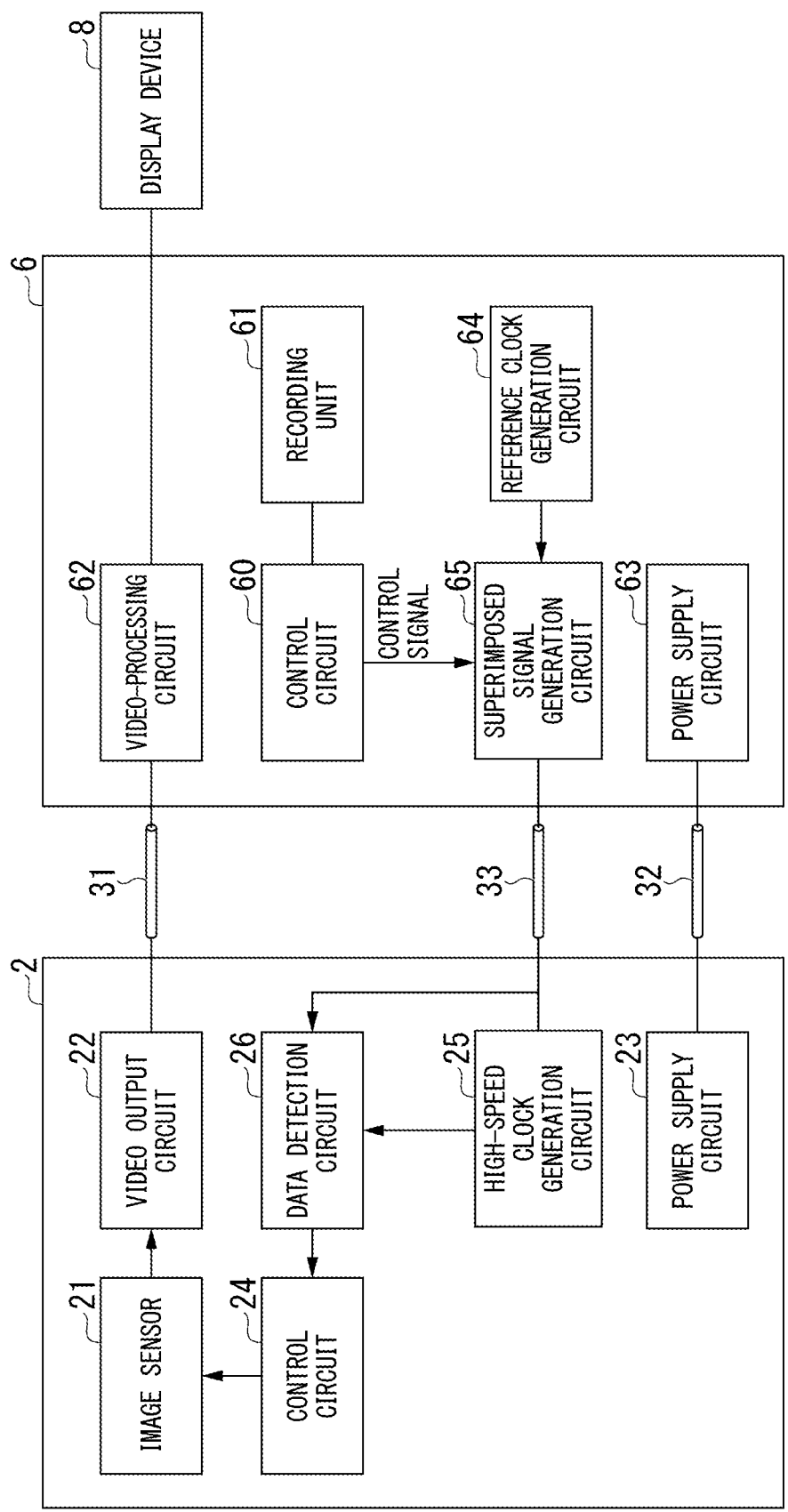
FIG. 2 is a block diagram of a camera unit and a control unit of the endoscope system.

FIG. 2 is a block diagram of the camera unit 2 and the control unit 6.

The camera unit 2 and the control unit 6 are connected by a transmission cable 3. The transmission cable 3 is a general term for a transmission path composed of a cable inserted through the insertion portion 10 of the endoscope 1, the universal cord 5, and the like. The transmission cable 3 has a video signal line 31 that transmits video signals, a power signal line 32 that transmits power, and a control signal line 33 that controls the camera unit 2.

The control signal line 33 is a single signal line that connects the camera unit 2 and the control unit 6. The control signal line 33 may have a differential signal line in the middle of the transmission path. Instead of the wired connection consisting of the transmission cable 3, the video signal line 31, and the control signal line 33, the camera unit 2 and the control unit 6 can be wirelessly connected.

[Camera Unit (Imaging Device) 2]

The camera unit (imaging device) 2 converts the subject image formed via the optical system 16 to generate an imaging signal. The camera unit 2 outputs the generated imaging signal to the control unit 6 via the video signal line 31. The camera unit 2 also receives power supply from the control unit 6 via the power signal line 32.

The camera unit 2 has an image sensor 21, a video output circuit 22, a power supply circuit 23, a control circuit 24, a high-speed clock generation circuit 25, and a data detection circuit 26, as shown in FIG. 2.

The image sensor 21 photoelectrically converts the subject image formed via the optical system 16 to generate an imaging signal. The image sensor 21 is, for example, a CCD image sensor, a CMOS image sensor, or the like.

The video output circuit 22 converts the imaging signal generated by the image sensor 21 into a digital signal and outputs it to the control unit 6 via the video signal line 31.

The power supply circuit 23 is supplied with power from the control unit 6 via the power signal line 32. The power supply circuit 23 supplies power to each circuit of the camera unit 2.

The control circuit 24 controls the camera unit 2 as a whole. The control circuit 24 has, for example, parameter registers of the image sensor 21. The parameter registers are controlled by control signals output from the control unit 6.

Figure 3:
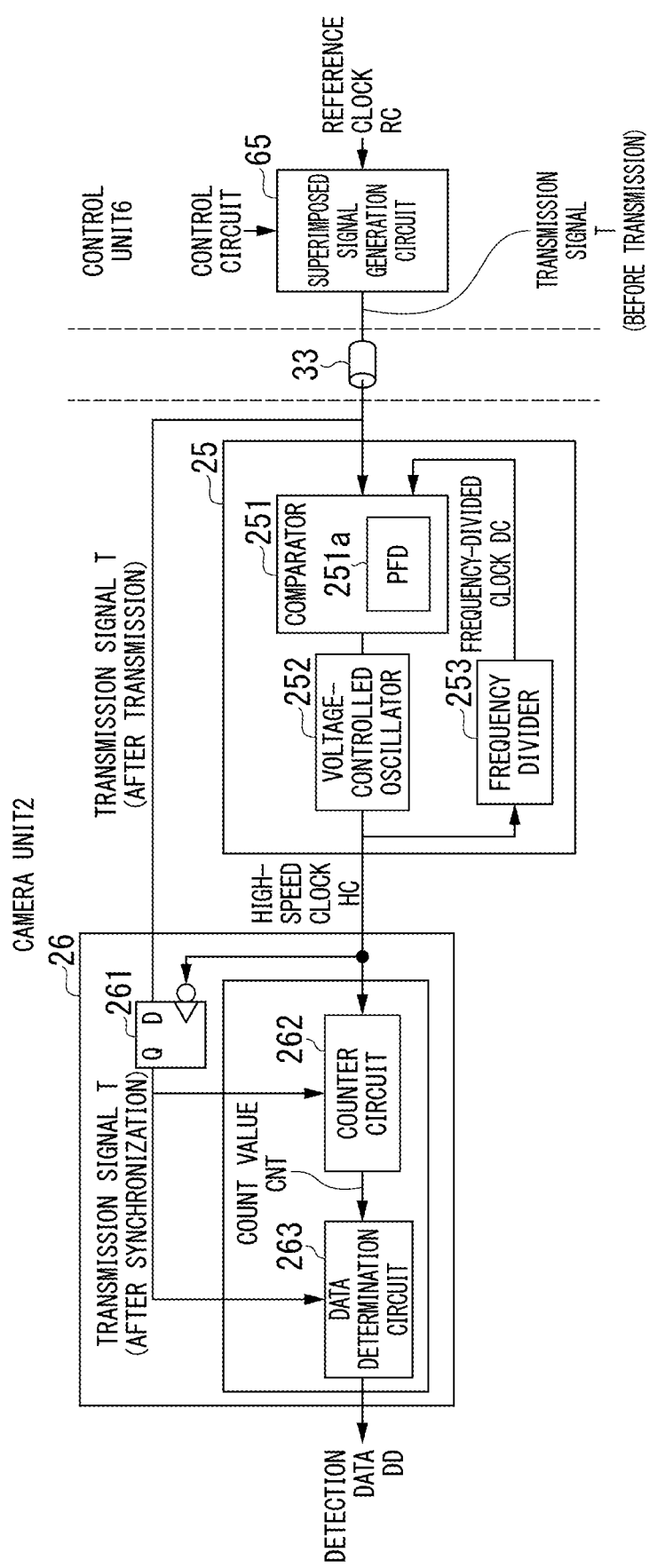
FIG. 3 is a diagram showing a circuit for multiplexing and demodulating transmission signals in the endoscope system.

FIG. 3 is a diagram showing a circuit for multiplexing and demodulating the transmission signal T.

The high-speed clock generation circuit 25 is a PLL (phase-locked loop) circuit that generates a high-speed clock HC from the multiplexed transmission signal T output from the control unit 6 via the control signal line 33.

The high-speed clock generation circuit 25 has a comparator 251, a voltage-controlled oscillator 252, and a frequency divider 253. The comparator 251, the voltage-controlled oscillator 252, and the frequency divider 253 are circuits appropriately selected from known PLL circuits. The voltage-controlled oscillator 252 includes a low-pass filter, charge pump, and the like.

The comparator 251 has a phase-frequency detector (PFD) 251a. The phase-frequency detector (PFD) 251a generates a voltage signal representing a phase difference and a frequency difference between the frequency-divided clock DC output by the frequency divider 253 and the transmission signal T (after transmission).

The data detection circuit 26 is a circuit that operates in synchronization with the high-speed clock HC, and is a circuit that detects a control signal from the multiplexed transmission signal output from the control unit 6. The data detection circuit 26 has a timing adjustment circuit 261, a counter circuit 262, and a data determination circuit 263.

[Control Unit (Control Device) 6]

The control unit (control device) 6 includes, as shown in FIG. 2, a control circuit 60, a recording unit 61, a video-processing circuit 62, a power supply circuit 63, a reference clock generation circuit 64, and a superimposed signal generation circuit 65.

The control circuit 60 centrally controls the entire endoscope system 100. Also, the control circuit 60 performs image processing on the video signal output from the camera unit 2. The control circuit 60 transfers an image to be displayed on the display device 8.

The control circuit 60 is a program-executable processing circuit (computer) having one or more processors (CPU, GPU, DSP, etc.) and a program-readable memory. The control circuit 60 controls the endoscope system 100 by executing an endoscope control program. The control circuit 60 may include a dedicated circuit. The dedicated circuit is a processor separate from the processor included in the control circuit 60, a logic circuit implemented in an ASIC or FPGA, or a combination thereof.

The recording unit 61 is a non-volatile recording medium that stores the above-described programs and necessary data. The recording unit 61 is composed of, for example, a flexible disk, a magneto-optical disk, a writable nonvolatile memory such as a ROM or flash memory, a portable medium such as a CD-ROM, or a storage device such as a hard disk built into a computer system.

The video-processing circuit 62 acquires the imaging signal from the video output circuit 22 via the video signal line 31. The video-processing circuit 62 converts the imaging signal into a video signal such as an NTSC signal. The control circuit 60 may perform at least part of the processing on the imaging signal. The generated video signal is transferred to the display device 8.

The power supply circuit 63 supplies power to each circuit of the control unit 6. Also, the power supply circuit 63 supplies power to the camera unit 2 via the power signal line 32.

The reference clock generation circuit 64 generates a reference clock RC and outputs it to the superimposed signal generation circuit 65. Also, the reference clock generation circuit 64 supplies the reference clock RC to each circuit of the control unit 6.

The superimposed signal generation circuit 65 is a circuit that multiplexes the control signal output from the control circuit 60 onto the reference clock RC generated by the reference clock generation circuit 64. The control signal multiplexed on the reference clock RC by the superimposed signal generation circuit 65 is serial data synchronized with the reference clock RC. The control signal serialization process may be performed by the control circuit 60 or by the superimposed signal generation circuit 65. As shown in FIG. 3, the transmission signal T in which the control signal is multiplexed on the reference clock RC is output to the camera unit 2 via the control signal line 33.

[Transmission Signal T]

Figure 4:
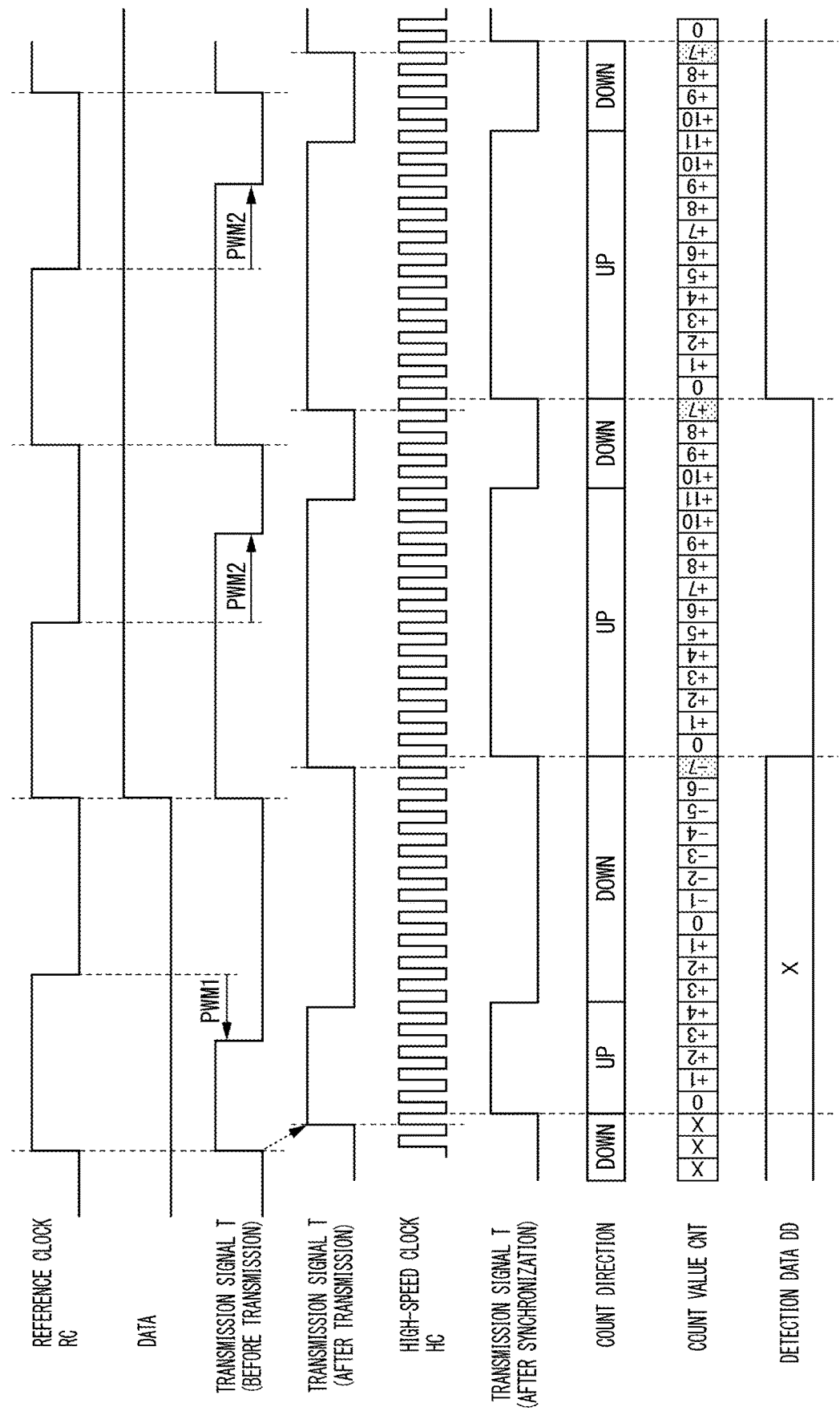
FIG. 4 is a timing chart of the data detection circuit of the camera unit.

FIG. 4 is a timing chart of the data detection circuit 26.

Next, the transmission signal T transmitted via the control signal line 33 will be described.

The superimposed signal generation circuit 65 changes the duty ratio of the reference clock RC by pulse width modulation to generate the transmission signal T in which the control signal is multiplexed on the reference clock RC. As shown in FIG. 4, in the multiplexed transmission signal T, the position of the rising edge does not change and the position of the falling edge changes.

In the following description, an edge whose position does not change in pulse width modulation is called a "fixed edge". In this embodiment, the "fixed edge" is the rising edge of the reference clock RC.

When the control signal, which is serial data, is Low, the superimposed signal generation circuit 65 changes the position of the falling edge of the reference clock RC to shorten the pulse width of the period in which the transmission signal T is High (indicated as PWM1 in FIG. 4). When the control signal, which is serial data, is High, the superimposed signal generation circuit 65 changes the position of the falling edge of the reference clock RC to lengthen the pulse width of the period in which the transmission signal T is High (indicated as PWM2 in FIG. 4). The pulse width modulation performed by the superimposed signal generation circuit 65 is not limited to this.

The transmission signal T (after transmission) transmitted via the control signal line 33 is delayed compared to the transmission signal T (before transmission) before transmission, as shown in FIG. 4. As shown in FIG. 3, the transmission signal T (after transmission) is input to the high-speed clock generation circuit 25 and the data detection circuit 26.

The high-speed clock generation circuit 25 generates the high-speed clock HC by multiplying the clock synchronized with the rise of the transmission signal T (after transmission) by 16. The high-speed clock generation circuit 25 outputs the generated high-speed clock HC to the data detection circuit 26. The high-speed clock HC is not limited to the above clocks as long as it has a higher frequency than the reference clock RC.

The frequency divider 253 feeds back the frequency-divided clock DC obtained by dividing the high-speed clock HC by 16 to the comparator 251. The comparator 251 compares the frequency-divided clock DC obtained by dividing the high-speed clock HC by 16 with the transmission signal T (after transmission). The comparator 251 outputs to the voltage-controlled oscillator 252 a phase difference and a frequency difference, which are results of comparison by the phase-frequency detector (PFD) 251a.

The timing adjustment circuit 261 is a D-type flip-flop that latches the transmission signal T (after transmission) in synchronization with the falling edge of the high-speed clock HC. The timing adjustment circuit 261 outputs the latched transmission signal T (after synchronization) to the counter circuit 262 and the data determination circuit 263.

The counter circuit 262 is a counter that operates in synchronization with the high-speed clock HC. The counter circuit 262 is incremented when the transmission signal T (after synchronization) is High. The counter circuit 262 is decremented when the transmission signal T (after synchronization) is low. The counter circuit 262 is reset to an initial value at the rising edge (fixed edge) of the transmission signal T (after synchronization).

The counter circuit 262 may be separated into a first counter that counts a period during which the transmission signal T (after synchronization) is High as a first count, and a second counter that counts a period in which the transmission signal T (after synchronization) is Low as a second count.

The counter circuit 262 counts the ratio of the period during which the transmission signal T (after synchronization) is High and the period during which the transmission signal T (after synchronization) is Low, in the period sandwiched between the rising edges (fixed edges) of the transmission signal T (after synchronization). That is, the counter circuit 262 determines the duty ratio of the transmission signal T (after synchronization).

In this embodiment, the initial value of the count value CNT is zero. The initial value of the count value CNT is not limited to zero. For example, the initial value of the count value CNT may be set so that the count value CNT is not a negative number.

The counter circuit 262 outputs the count value CNT to the data determination circuit 263.

The data determination circuit 263 acquires the count value CNT from the counter circuit 262. When the count value CNT is reset to the initial value by the rising edge of the transmission signal T (after synchronization), the data determination circuit 263 compares the count value CNT before being reset with the initial value of the counter circuit 262. When the count value CNT is smaller than the initial value of the counter circuit 262, the data determination circuit 263 determines that the transmission signal T is modulated so that the pulse width of the period when it is High is shortened, and outputs Low as the detection data DD. When the count value CNT is greater than the initial value of the counter circuit 262, the data determination circuit 263 determines that the transmission signal T is modulated so that the pulse width of the period when it is High is long, and outputs High as the detection data DD.

The higher the frequency of the high-speed clock HC than the reference clock RC, the more accurately the data determination circuit 263 demodulates data.

According to the endoscope system 100 of the present embodiment, the high-speed clock HC synchronized with the transmission signal T is generated, the duty ratio of the transmission signal T is counted by the counter circuit 262 synchronized with the high-speed clock HC, and a control signal is detected from the multiplexed transmission signal T. Therefore, the endoscope system 100 can correctly demodulate the control signal from the multiplexed transmission signal even when there is a phase difference between the multiplexed transmission signal T and the high-speed clock HC separated from the transmission signal.

The data detection circuit 26 counts the duty ratio of the transmission signal T in synchronization with the high-speed clock HC faster than the reference clock RC. Therefore, even if there is a phase difference between the multiplexed transmission signal T and the high-speed clock HC separated from the transmission signal, the data detection circuit 26 can correctly detect whether the transmission signal T is modulated with a short pulse width (PWM1) or is modulated with a long pulse width (PWM2).

The first embodiment of the present invention has been described above in detail with reference to the drawings, but the specific configuration is not limited to this embodiment, and design changes and the like are included within the scope of the present invention. Also, the constituent elements shown in the above-described embodiment and modification can be combined as appropriate.

(Modification 1-1)

In the above embodiment, the fixed edge whose edge position does not change in pulse width modulation is the rising edge of the reference clock RC. However, the mode of pulse width modulation is not limited to this. The fixed edge may be the falling edge of the reference clock RC. In this case, the high-speed clock generation circuit 25 operates with reference to the falling edge of the transmission signal T (after transmission). Also, the counter circuit 262 resets the count value CNT to the initial value at the falling edge of the transmission signal T (after synchronization).

Second Embodiment

An endoscope system 100B according to a second embodiment of the present invention will be described with reference to FIG. 5. In the following description, the same reference numerals are given to the same configurations as those already described, and redundant descriptions will be omitted. The endoscope system 100B differs from the endoscope system 100 according to the first embodiment in the operation of the counter circuit 262 of the data detection circuit 26.

Figure 5:
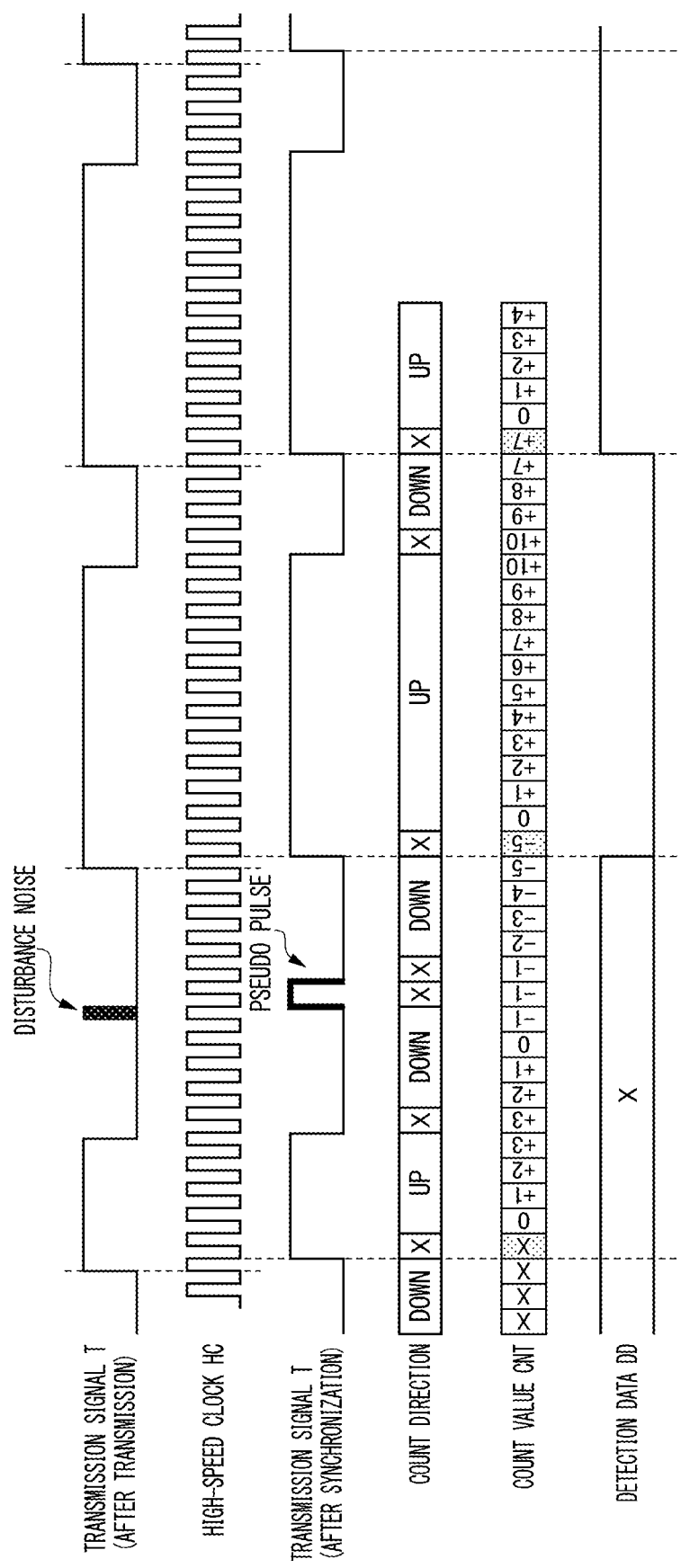
FIG. 5 is a timing chart of the data detection circuit of the endoscope system according to a second embodiment.

FIG. 5 is a timing chart of the data detection circuit 26.

The counter circuit 262 disables subtraction and addition of the count value CNT for a predetermined period after the data of the transmission signal T (after synchronization) is inverted (in FIG. 5, the count direction is indicated as "X"). A predetermined period during which the counter circuit 262 disables the addition and subtraction of the count value CNT is referred to as a "decrementation invalidation period". In the example shown in FIG. 5, the subtraction invalidation period is one clock period of the high-speed clock HC.

Specifically, as shown in FIG. 5, the counter circuit 262 maintains the count value CNT without decrementing it for a period of one clock after the data of the transmission signal T (after synchronization) is inverted from High to Low. In addition, the counter circuit 262 maintains the count value CNT without incrementing it for one clock period after the data of the transmission signal T (after synchronization) is inverted from Low to High.

When the transmission signal T (after synchronization) includes pulse-shaped noise (pseudo pulse) due to disturbance noise contained in the transmission signal T (after transmission) as shown in FIG. 5, the counter circuit 262 can reduce the effects of pseudo pulses. The counter circuit 262 cannot completely eliminate the influence of the pseudo pulse, but if the pulse width of the pseudo pulse is short, the counter circuit 262 can detect a sufficient duty ratio to correctly demodulate the control signal from the multiplexed transmission signal.

According to the endoscope system 100B of the present embodiment, the high-speed clock HC synchronized with the transmission signal T is generated, the duty ratio of the transmission signal T is counted by the counter circuit 262 synchronized with the high-speed clock HC, and a control signal is detected from the multiplexed transmission signal T. Therefore, even if the above-mentioned subtraction and addition invalidation period is not provided, it is easier for the endoscope system 100B to detect the control signal from the transmission signal T (after synchronization) containing the pseudo pulse than the conventional technology described in Patent Document 1 and the like.

According to the endoscope system 100B of the present embodiment, by providing the subtraction and addition invalidation period, the control signal can be accurately demodulated from the transmission signal T (after synchronization) containing the pseudo pulse by reducing the influence of the pseudo pulse.

The second embodiment of the present invention has been described above in detail with reference to the drawings, but the specific configuration is not limited to this embodiment, and design changes and the like are also included within the scope of the present invention. Also, the constituent elements shown in the above-described embodiment and modification can be combined as appropriate.

(Modification 2-1)

In the above embodiment, the subtraction invalidation period in the counter circuit 262 is one clock. However, the operation mode of the counter circuit 262 is not limited to this. The subtraction invalidation period may be longer than one clock. The counter circuit 262 can reduce the influence of pseudo pulses with longer pulse widths by lengthening the subtraction and addition invalidation period.

Third Embodiment

An endoscope system 100C according to a third embodiment of the present invention will be described with reference to FIGS. 6 to 8. In the following description, the same reference numerals are given to the same configurations as those already described, and redundant descriptions will be omitted. The endoscope system 100C includes a high-speed clock generation circuit 25C instead of the high-speed clock generation circuit 25, as compared with the endoscope system 100 according to the first embodiment.

Figure 6:
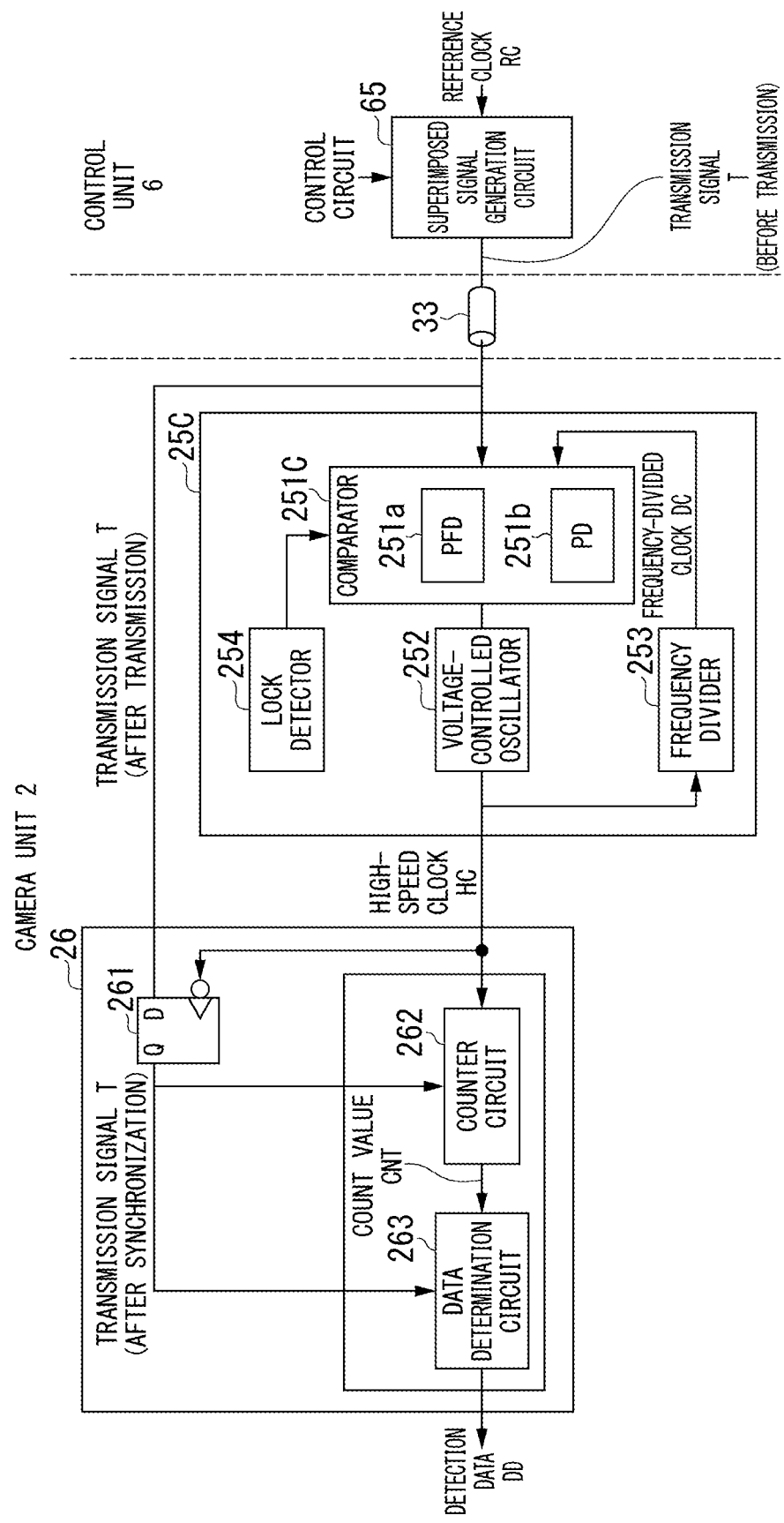
FIG. 6 is a diagram showing a circuit for multiplexing and demodulating transmission signals in an endoscope system according to a third embodiment.

FIG. 6 is a diagram showing a circuit for multiplexing and demodulating the transmission signal T.

The high-speed clock generation circuit 25C is a PLL (phase-locked loop) circuit that generates the high-speed clock HC from the multiplexed transmission signal T output from the control unit 6 via the control signal line 33.

The high-speed clock generation circuit 25C has a comparator 251C, a voltage-controlled oscillator 252, a frequency divider 253, and a LOCK detector 254. The comparator 251C, the voltage-controlled oscillator 252, the frequency divider 253 and the LOCK detector 254 are circuits appropriately selected from known PLL circuits. The voltage-controlled oscillator 252 includes a low-pass filter and the like.

The comparator 251C has a phase-frequency detector (PFD) 251a and a phase detector (PD) 251b. The phase detector (PD) 251b generates a voltage signal representing the phase difference between the rising edge of the frequency-divided clock DC and the rising edge (fixed edge) of the transmission signal T (after transmission).

The comparator 251C operates by switching between two operation modes, namely a frequency comparison mode that compares the frequencies of two inputs using a phase-frequency detector (PFD) 251a, and a phase comparison mode that compares the phases of two inputs using a phase detector (PD) 251b.

The LOCK detector 254 detects the LOCK state in a PLL (phase-locked loop) circuit composed of the comparator 251C, the voltage-controlled oscillator 252 and the frequency divider 253. The LOCK detector 254 asserts the LOCK signal when the comparison result of the two inputs by the comparator 251C matches. The LOCK detector 254 outputs a LOCK signal to the high-speed clock generation circuit 25C.

Figure 7:
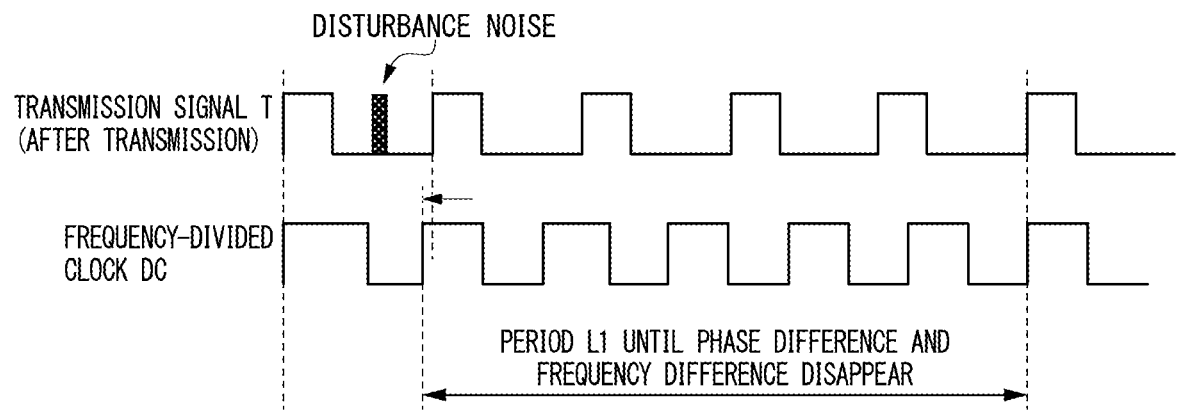
FIG. 7 is a timing chart of a reference clock generation circuit operating in frequency comparison mode.

FIG. 7 is a timing chart of the high-speed clock generation circuit 25C operating in frequency comparison mode. When the operation mode is the frequency comparison mode, the high-speed clock generation circuit 25C controls the frequency-divided clock DC so that there is no frequency difference between the frequency-divided clock DC and the transmission signal T (after transmission). Furthermore, in the frequency comparison mode, the frequency-divided clock DC is controlled so that the phases of the frequency-divided clock DC and the transmission signal T (after transmission) disappear.

Figure 8:
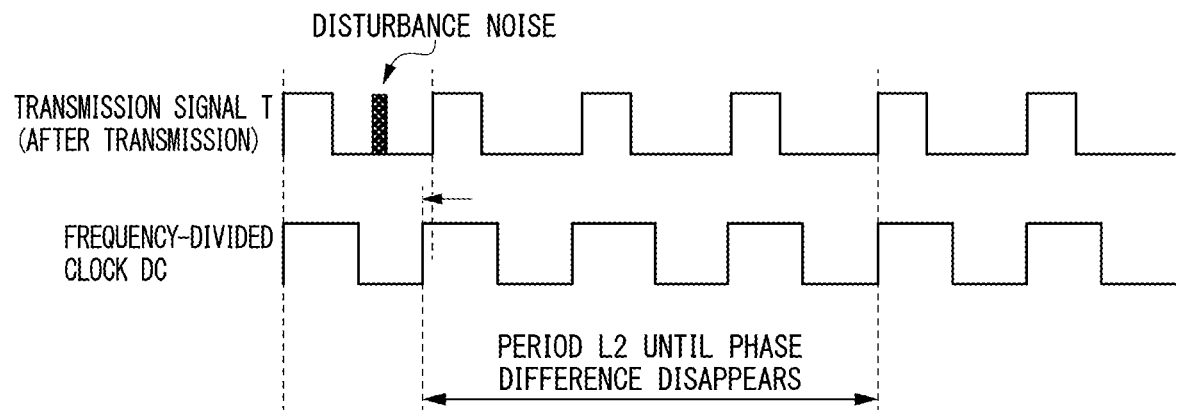
FIG. 8 is a timing chart of a reference clock generation circuit operating in phase comparison mode.

FIG. 8 is a timing chart of the high-speed clock generation circuit 25C operating in the phase comparison mode. When the operation mode is the phase comparison mode, the high-speed clock generation circuit 25C controls the frequency-divided clock DC so that there is no phase difference between the frequency-divided clock DC and the transmission signal T (after transmission).

After disturbance noise occurs, the period L2 (see FIG. 8) until the phase difference disappears in the phase comparison mode is shorter than the period L1 (see FIG. 7) until the frequency difference disappears in the frequency comparison mode. Also, when the frequency comparison mode compares the phase difference and the frequency difference, the period until the phase difference disappears in the phase comparison mode is shorter than the period until the phase difference and the frequency difference disappear in the frequency comparison mode. This is because, in the frequency comparison mode, the high-speed clock generation circuit 25C controls the frequency-divided clock DC so that the number of edges of the frequency-divided clock DC and the number of edges of the transmission signal T (after transmission) are aligned, so it is susceptible to pulse-shaped disturbance noise having edges.

Therefore, the high-speed clock generation circuit 25C sets the operation mode to the frequency comparison mode only during the startup period after power-on, and then switches the operation mode to the phase comparison mode.

The high-speed clock generation circuit 25C controls the frequency-divided clock DC with the operation mode set to the frequency comparison mode during the startup period after power-on. The frequency-divided clock DC is controlled to have the same frequency as the reference clock RC.

When the phase difference and frequency difference between the frequency-divided clock DC and the transmission signal T (after transmission) disappear, the LOCK detector 254 asserts the LOCK signal. When the LOCK signal is asserted, the high-speed clock generation circuit 25C switches the operation mode from frequency comparison mode to phase comparison mode.

According to the endoscope system 100C of this embodiment, by switching the operation mode to the phase comparison mode after the startup period after power-on, a high-quality high-speed clock HC can be generated from the transmission signal T (after transmission) containing disturbance noise.

The third embodiment of the present invention has been described above in detail with reference to the drawings, but the specific configuration is not limited to this embodiment, and design changes and the like are included within the scope of the present invention. Also, the constituent elements shown in the above-described embodiment and modification can be combined as appropriate.

(Modification 3-1)

In the above embodiment, the comparator 251C has a phase-frequency detector (PFD) 251a and a phase detector (PD) 251b. However, the circuit configuration of the comparator 251C is not limited to this. The comparator 251C may have only the phase-frequency detector (PFD) 251a and may have a circuit configuration that resets the phase comparison operation of the phase-frequency detector (PFD) 251a at the falling edge of the divided clock DC when the LOCK signal is asserted. When the LOCK signal is asserted, the phase-frequency detector (PFD) 251a outputs a signal similar to the phase detector (PD) 251b.

Fourth Embodiment

An endoscope system 100D of a fourth embodiment of the present invention will be described with reference to FIGS. 9 to 10. In the following description, the same reference numerals are given to the same configurations as those already described, and redundant descriptions will be omitted. The endoscope system 100D includes a high-speed clock generation circuit 25D instead of the high-speed clock generation circuit 25, as compared with the endoscope system 100 according to the first embodiment.

Figure 9:
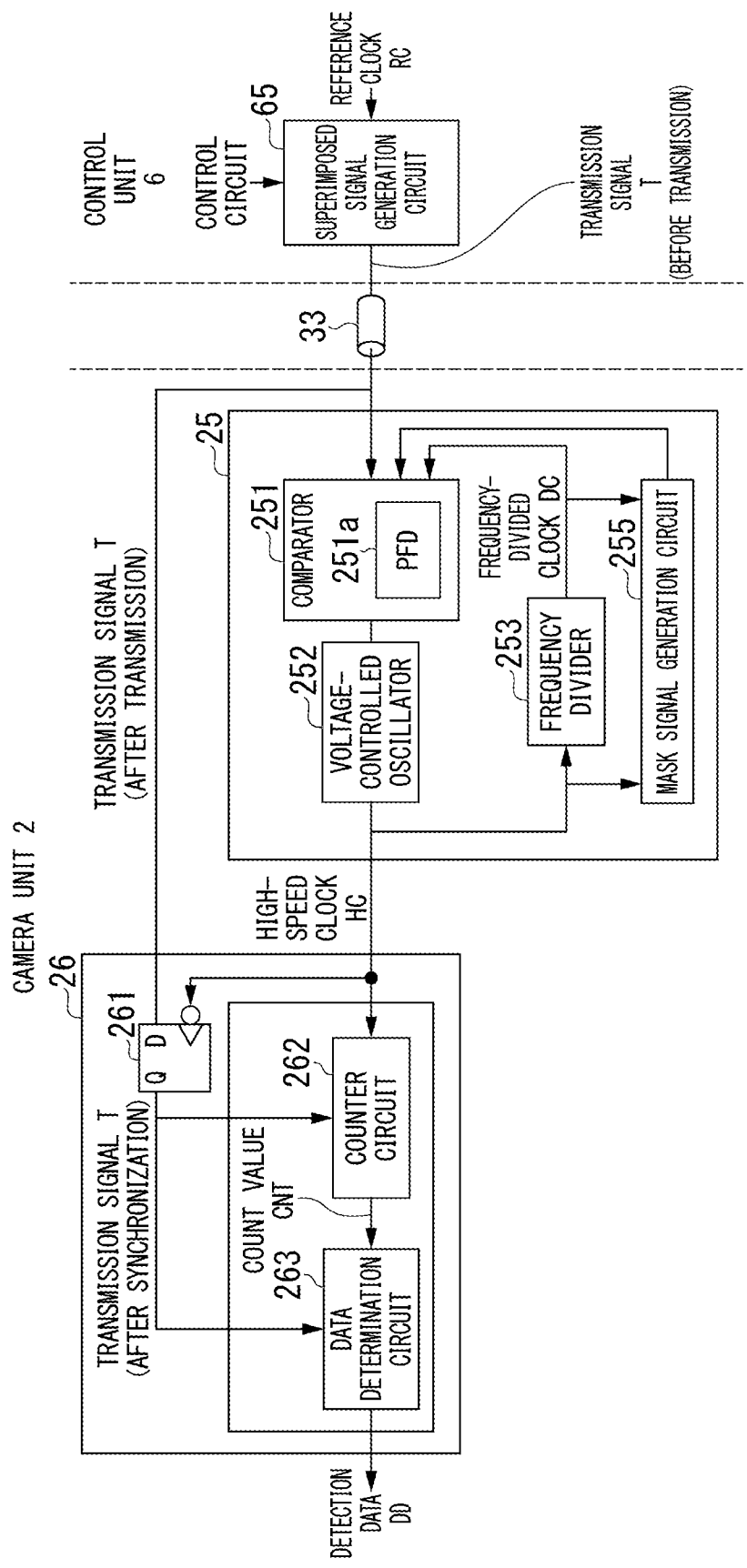
FIG. 9 is a diagram showing a circuit for multiplexing and demodulating transmission signals in an endoscope system according to a fourth embodiment.

FIG. 9 is a diagram showing a circuit for multiplexing and demodulating the transmission signal T.

The high-speed clock generation circuit 25D is a PLL (phase-locked loop) circuit that generates a high-speed clock HC from the multiplexed transmission signal T output from the control unit 6 via the control signal line 33.

The high-speed clock generation circuit 25D has a comparator 251, a voltage-controlled oscillator 252, a frequency divider 253, and a mask signal generation circuit 255.

Figure 10:
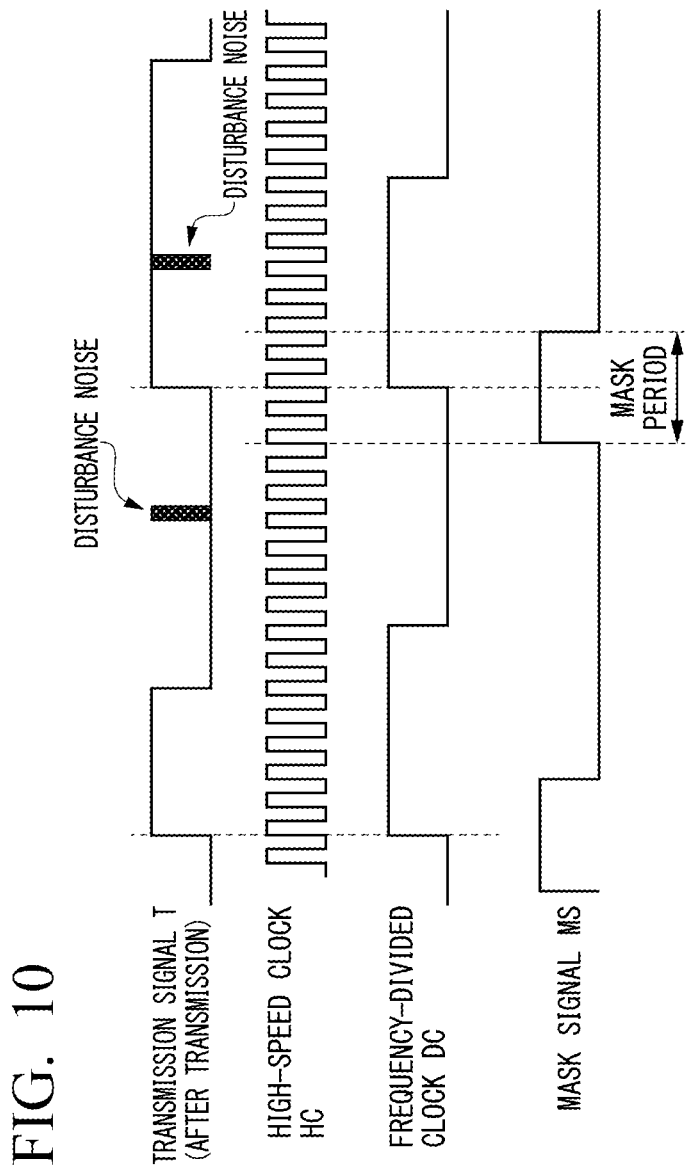
FIG. 10 is a timing chart of a mask signal generation circuit in the endoscope system.

FIG. 10 is a timing chart of the mask signal generation circuit 255.

The mask signal generation circuit 255 generates a mask signal MS that is asserted during a predetermined period before and after the rising edge (fixed edge) of the frequency-divided clock DC. A predetermined period during which the mask signal MS is asserted (high in this embodiment) is referred to as a "mask period". In the example shown in FIG. 10, the mask period is a period of four high-speed clocks HC. The mask signal generation circuit 255 outputs mask signal MS to comparator 251.

The comparator 251 compares the frequency-divided clock DC and the transmission signal T (after transmission) only during the mask period when the mask signal MS is asserted. Therefore, as shown in FIG. 10, when disturbance noise is included in the transmission signal T (after transmission) during a period other than the mask period, the comparator 251 can eliminate the influence of the disturbance noise. As a result, the high-speed clock generation circuit 25D can generate a high-quality high-speed clock HC from the transmission signal T (after transmission).

According to the endoscope system 100D of this embodiment, by using the mask signal MS, a high-quality high-speed clock HC can be generated from the transmission signal T (after transmission) containing disturbance noise.

The fourth embodiment of the present invention has been described above in detail with reference to the drawings, but the specific configuration is not limited to this embodiment, and design changes and the like are included within the scope of the present invention. Also, the constituent elements shown in the above-described embodiment and modification can be combined as appropriate.

(Modification 4-1)

In the above embodiment, the comparator 251 has only a phase-frequency detector (PFD) 251a. However, the circuit configuration of comparator 251 is not limited to this. The comparator 251 may have a phase detector (PD) 251b like the comparator 251C of the third embodiment. The phase detector (PD) 251b compares the frequency-divided clock DC with the transmission signal T (after transmission) only during the mask period when the mask signal is asserted. This allows the comparator 251 to eliminate the influence of disturbance noise. As a result, the high-speed clock generation circuit 25D can generate a high-quality high-speed clock HC from the transmission signal T (after transmission).

Fifth Embodiment

An endoscope system 100E according to a fifth embodiment of the present invention will be described with reference to FIGS. 11 and 12. In the following description, the same reference numerals are given to the same configurations as those already described, and redundant descriptions will be omitted. The endoscope system 100E includes a high-speed clock generation circuit 25E instead of the high-speed clock generation circuit 25 as compared with the endoscope system 100 according to the first embodiment.

Figure 11:
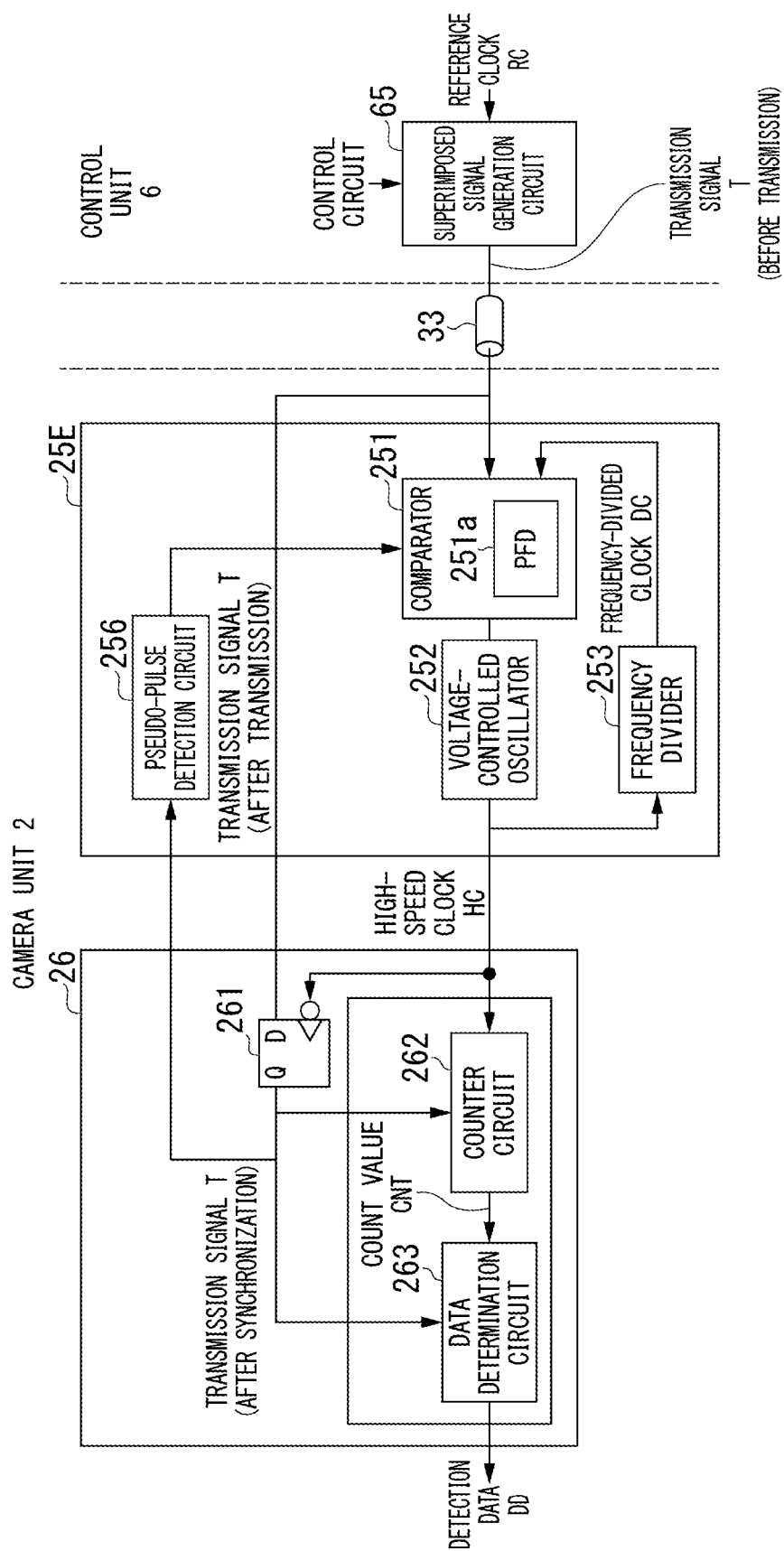
FIG. 11 is a diagram showing a circuit for multiplexing and demodulating transmission signals in an endoscope system according to a fifth embodiment.

FIG. 11 is a diagram showing a circuit for multiplexing and demodulating the transmission signal T.

The high-speed clock generation circuit 25E is a PLL (phase-locked loop) circuit that generates the high-speed clock HC from the multiplexed transmission signal T output from the control unit 6 via the control signal line 33.

The high-speed clock generation circuit 25E has a comparator 251, a voltage-controlled oscillator 252, a frequency divider 253, and a pseudo-pulse detection circuit 256.

Figure 12:
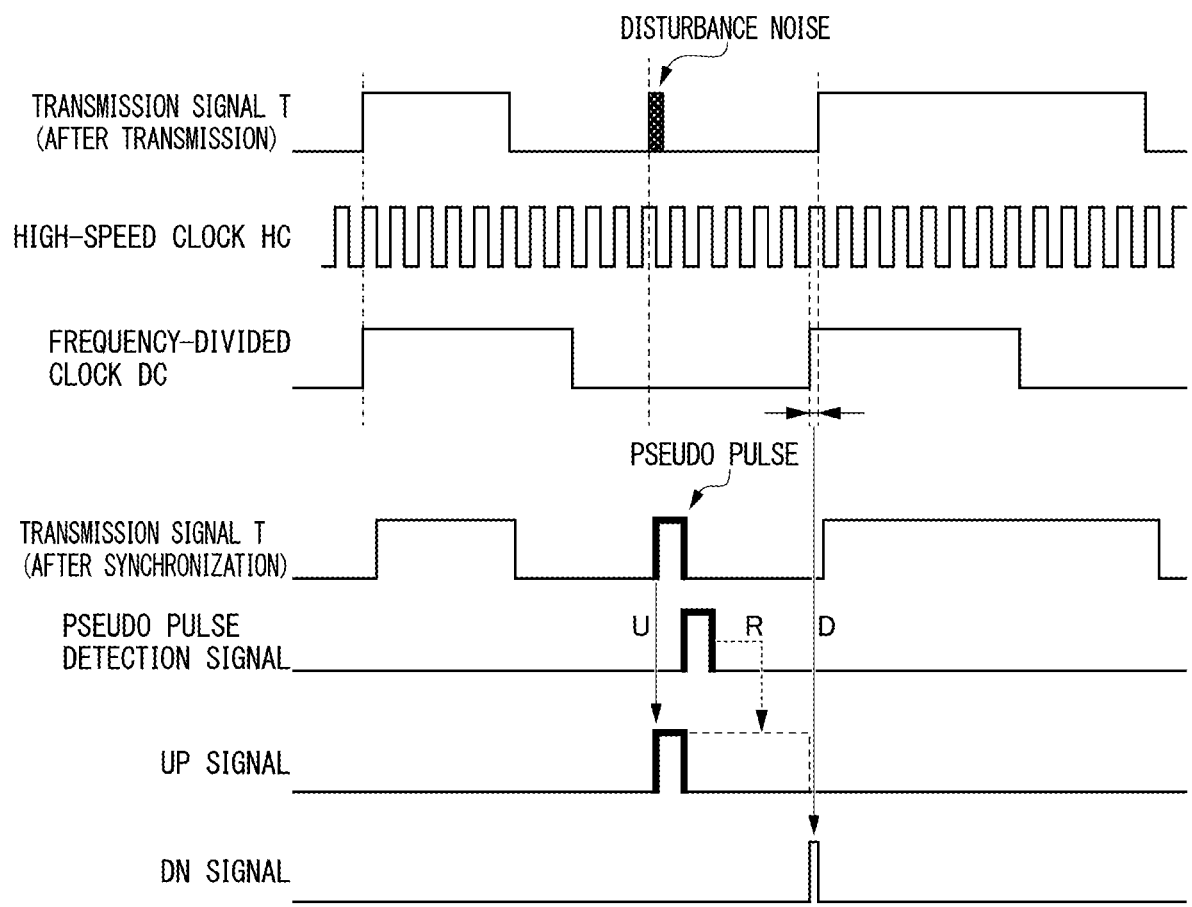
FIG. 12 is a timing chart of a reference clock generation circuit in the endoscope system.

FIG. 12 is a timing chart of the high-speed clock generation circuit 25E.

The pseudo-pulse detection circuit 256 is a circuit that detects a pseudo pulse with a short pulse width from the transmission signal T (after synchronization). For example, the pseudo-pulse detection circuit 256 detects a pulse whose pulse width is one clock period of the high-speed clock HC. The pseudo-pulse detection circuit 256 asserts a pseudo-pulse detection signal output to the comparator 251.

The comparator 251 outputs to the voltage-controlled oscillator 252 a voltage signal representing the phase difference and frequency difference between the frequency-divided clock DC and the transmission signal T (after transmission). Specifically, the comparator 251 outputs an UP signal and a DOWN signal to voltage-controlled oscillator 252. The UP signal is asserted when the frequency of the divided clock DC is lower than or lags behind the frequency of the transmission signal T (after transmission). The DOWN signal is asserted when the frequency of the divided clock DC is higher or leads the frequency of the transmission signal T (after transmission). The voltage-controlled oscillator 252 adjusts the frequency of the high-speed clock HC based on the UP signal and DOWN signal.

When disturbance noise as shown in FIG. 12 is included in the transmission signal T (after transmission), the comparator 251 erroneously recognizes that the frequency of the frequency-divided clock DC is lower than the frequency of the transmission signal T (after transmission), and asserts the UP signal (represented by "U" in FIG. 12).

The voltage-controlled oscillator 252 adjusts the frequency of the high-speed clock HC to be higher when the UP signal is asserted due to erroneous recognition based on the pseudo pulse. On the other hand, the voltage-controlled oscillator 252 resets the UP signal and the DOWN signal (represented by "R" in FIG. 12) when the pseudo-pulse detection signal is asserted.

The high-speed clock generation circuit 25E can reduce the effects of erroneous frequency adjustment based on erroneous recognition by resetting the UP signal asserted due to erroneous recognition based on the pseudo pulse.

After the occurrence of disturbance noise, the rising edge of the frequency-divided clock DC is earlier than the rising edge of the transmission signal T (after transmission) due to the influence of the assertion of the UP signal. Therefore, the comparator 251 asserts the DOWN signal (represented by "D" in FIG. 12).

According to the endoscope system 100E of the present embodiment, by resetting the UP signal and the DOWN signal using the detected pseudo pulse, a high-quality high-speed clock HC can be generated from the transmission signal T (after transmission) containing disturbance noise.

The fifth embodiment of the present invention has been described above in detail with reference to the drawings, but the specific configuration is not limited to this embodiment, and design changes and the like are included within the scope of the present invention. Also, the constituent elements shown in the above-described embodiment and modification can be combined as appropriate.

(Modification 5-1)

Figure 13:
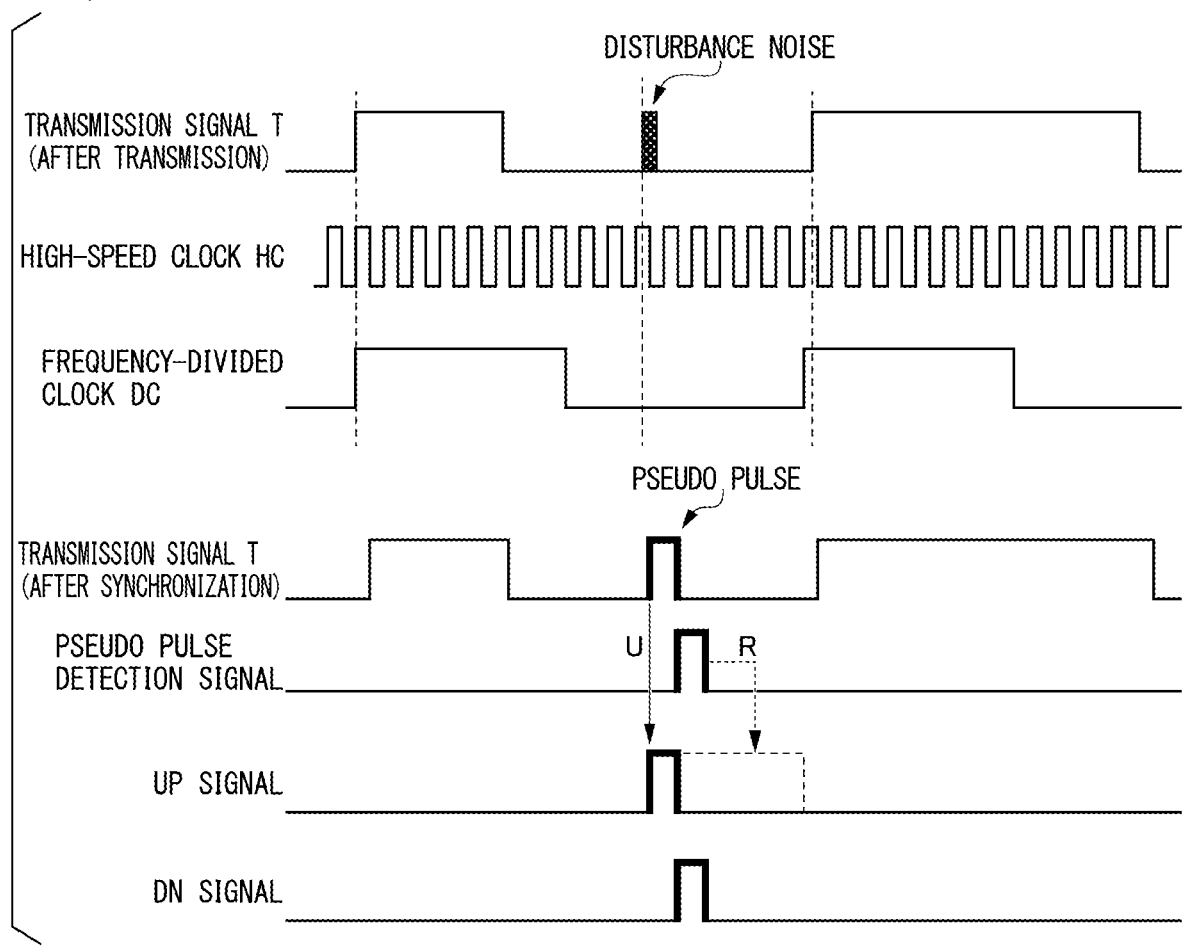
FIG. 13 is a timing chart of a modification of the reference clock generation circuit.

In the above embodiment, the voltage-controlled oscillator 252 resets the UP and DOWN signals when the pseudo pulse detect signal is asserted. However, the voltage-controlled oscillator 252 may control the UP and DOWN signals more aggressively. FIG. 13 is a timing chart of a modification of the high-speed clock generation circuit 25E. The voltage-controlled oscillator 252 may assert the DOWN signal to compensate for an incorrect frequency adjustment due to an asserted UP signal due to pseudo pulse-based misrecognition. The influence of wrong frequency adjustment based on misrecognition can be further reduced.

The program in each embodiment may be recorded in a computer-readable recording medium, and the program recorded in this recording medium may be read into a computer system and executed. The "computer system" includes hardware such as an OS and peripheral devices. The term "computer-readable recording medium" refers to portable media such as flexible discs, magneto-optical discs, ROMs and CD-ROMs, and storage devices such as hard discs incorporated in computer systems. Furthermore, the "computer-readable recording medium" may include those that dynamically retain the program for a short period of time like a communication line for transmitting a program via a network such as the Internet or a communication line such as a telephone line, and those that retain the program for a certain period of time like the volatile memory inside the computer system that becomes the server and client in that case. Further, the program may be for realizing some of the functions described above, or may be capable of realizing the functions described above in combination with a program already recorded in the computer system.

What is claimed is:

1. An endoscope system in which a scope and a control unit are communicably connected,
    wherein the control unit includes
        a reference clock generation circuit configured to generate a reference clock, and
        a superimposed signal generation circuit configured to generate a transmission signal in which data is multiplexed by changing a duty ratio of the reference clock, and
    the scope includes
        a high-speed clock generation circuit configured to generate a high-speed clock having a higher frequency than the reference clock,
        a counter circuit configured to determine the duty ratio of the transmission signal in synchronization with the high-speed clock, and
        a data determination circuit configured to demodulate the data based on the duty ratio determined by the counter circuit,
    wherein the high-speed clock generation circuit synchronizes the transmission signal and the high-speed clock by comparing the transmission signal and a frequency-divided clock obtained by dividing the high-speed clock.

2. The endoscope system according to claim 1, wherein the counter circuit determines the duty ratio by a counter that is incremented when the transmission signal is one of High and Low, and is decremented when the transmission signal is the other of High and Low.

3. The endoscope system according to claim 1, wherein the counter circuit determines the duty ratio by a first counter that counts a period during which the transmission signal is High as a first count, and a second counter that counts a period during which the transmission signal is Low as a second count.

4. The endoscope system according to claim 1, wherein the counter circuit disables a counting operation for a predetermined period from an edge of the transmission signal.

5. The endoscope system according to claim 1, wherein the high-speed clock generation circuit further includes a mask generation circuit that generates a mask signal that limits a period for comparing the transmission signal and the frequency-divided clock.

6. The endoscope system according to claim 5, wherein the mask generation circuit generates the mask signal that is activated in a predetermined period before and after a fixed edge that is not modulated among edges of the transmission signal.

7. The endoscope system according to claim 1, wherein
    the high-speed clock generation circuit further includes a pseudo-pulse detection circuit that detects a pseudo-pulse from the transmission signal, and
    the high-speed clock generation circuit resets a comparison result between the transmission signal and the frequency-divided clock when detecting a pseudo pulse.

8. A scope that is communicably connected to a control unit in an endoscope system, the scope comprising:
    a high-speed clock generation circuit configured to receive a data-multiplexed transmission signal by changing a duty ratio of a reference clock in the control unit, and generate a high-speed clock having a higher frequency than the reference clock;
    a counter circuit configured to determine the duty ratio of the transmission signal in synchronization with the high-speed clock; and
    a data determination circuit configured to demodulate data based on the duty ratio determined by the counter circuit,
    wherein the high-speed clock generation circuit synchronizes the transmission signal and the high-speed clock by comparing the transmission signal and a frequency-divided clock obtained by dividing the high-speed clock.

9. The scope according to claim 8, wherein the counter circuit determines the duty ratio by a counter that is incremented when the transmission signal is one of High and Low, and is decremented when the transmission signal is the other of High and Low.

10. The scope according to claim 8, wherein the counter circuit determines the duty ratio by a first counter that counts a period during which the transmission signal is High as a first count, and a second counter that counts a period during which the transmission signal is Low as a second count.

11. The scope according to claim 8, wherein the counter circuit disables the counting operation for a predetermined period from an edge of the transmission signal.

* * * * *